United States Patent [19]

Petzetakis

[11] 3,926,223

[45] Dec. 16, 1975

[54] LARGE DIAMETER HOLLOW BODIES OF HELICAL THERMOPLASTIC STRIP

[76] Inventor: Aristovoulos George Petzetakis, Thessaloniki & Chandri Street, Moschaton, Piraeus, Greece

[22] Filed: June 19, 1973

[21] Appl. No.: 371,558

[30] Foreign Application Priority Data
June 21, 1972 Greece .................................. 48609

[52] U.S. Cl. .......... 138/129; 138/144; 138/DIG. 11
[51] Int. Cl.² .......................................... F16L 11/12
[58] Field of Search .......... 138/130, 129, 111, 122, 138/118, DIG. 11, 144, 150, 154, 142

[56] References Cited
UNITED STATES PATENTS

| 2,576,835 | 11/1951 | Hewitt, Jr. ..................... 138/122 X |
| 2,640,501 | 6/1953 | Scott et al. ..................... 138/130 X |
| 2,874,722 | 2/1959 | Hamblin ......................... 138/144 X |
| 3,811,478 | 5/1974 | Ahlquist .......................... 138/129 |

FOREIGN PATENTS OR APPLICATIONS

| 905,767 | 9/1962 | United Kingdom ................. 138/129 |
| 1,178,685 | 1/1970 | United Kingdom ................. 138/129 |
| 905,766 | 9/1962 | United Kingdom ................. 138/129 |

*Primary Examiner*—Richard C. Queisser
*Assistant Examiner*—Daniel M. Yasich
*Attorney, Agent, or Firm*—Karl F. Ross; Herbert Dubno

[57] ABSTRACT

A large-diameter hollow body, especially pipe such as waste or sewage pipe, consisting of a multiplicity of helical turns of an extruded thermoplastic synthetic-resin hollow strip heat-sealed together in laterally abutting relationship. The thermal butt welds are provided in planes transverse to the axis so that the inner surface has turns which are flush with one another. The turns themselves are hollow and of a generally rectangular profile with a substantially round (preferably circular) inner cross-section.

3 Claims, 11 Drawing Figures

LARGE DIAMETER HOLLOW BODIES OF HELICAL THERMOPLASTIC STRIP

CROSS-REFERENCE TO RELATED APPLICATION

The present application relates to subject matter disclosed and claimed in the commonly owned copending application Ser. No. 371,559 filed by me concurrently herewith and disclosing a method of and an apparatus for producing the product of the present application.

FIELD OF THE INVENTION

The present invention relates to large-diameter hollow bodies and, more particularly, to large-diameter pipes, ducts and tubes or cylindrical containers, especially sewage or waste pipe.

BACKGROUND OF THE INVENTION

Various systems for the continuous production of pipes, ducts, tubes and even cylindrical containers or vessels have been proposed heretofore and I particularly am concerned with the helical-seam technique for the fabrication of tubes, pipes and ducts.

When working with metal, it is now a common practice to produce helical-seam pipe by feeding a metal strip generally tangentially onto a mandrel or around a cylindrical surface at an angle to the axis in the direction of feed to produce a succession of turns of the strip which laterally abut or overlap, the abutting portions being provided with a deposit weld or being fused together in some other manner. As a result, a pipe of large diameter and substantially limitless length can be produced from a strip of unlimited length but small width. Such pipe has been used for a variety of purposes.

It has also been proposed to use the seam or similar techniques in the formation of synthetic-resin pipes, tubes or ducts, employing extruded strip which is bent in a plastic state of the material into a helical configuration. For the most part the successive turns overlap and thus lateral flanges are provided to achieve the overlapping mentioned. The successive turns are thermally welded or heat sealed together, using heat applied at the site at which each successive turn meets the preceding turn and/or by the use of solvent welding or adhesive bonding techniques.

In practice, such synthetic-resin pipes are of limited strength and resistance to inwardly directed radial compression forces as may arise when the pipe is laid in the ground and hence large-scale use of such pipe in sewage or waste applications has not been achieved.

Furthermore, the overlapping bonds between adjacent turns frequently produce a corrugated or helical-groove phenomenon along the inner surface of the pipe which may impede flow of fluid material therethrough, especially with viscous material and materials of a high solid content like sewage sludge.

In addition, where butt welds have been used between strips, grooves are frequently found along the butt-welded seam in the interior of the pipe, tube or conduit which cannot readily be filled except with expensive interior coating techniques, these grooves likewise creating impediments to laminar flow of the liquid.

Consequently, in spite of intensive efforts for over 30 years to develop synthetic resins, it has not been possible to provide a fully satisfactory synthetic-resin sewage pipe without the aforedescribed disadvantages.

OBJECTS OF THE INVENTION

It is the principal object of the present invention to provide an improved large-diameter pipe, tube, conduit, container, vessel or receptacle of synthetic-resin material whereby the aforedescribed disadvantages are obviated.

SUMMARY OF THE INVENTION

This object and others which become apparent hereinafter are attained, in accordance with the present invention in a duct, especially for use as a sewage or waste pipe, which comprises a multiplicity of helical laterally abutting turns of a tubular (hollow-profile) strip of thermoplastic synthetic-resin material with the adjoining turns being bonded together by butt welds. The term "butt weld" is here used to describe a weld seam in which the adjoining and contacting wall portions are brought into direct contact and are bonded over surface regions (surface bonding) without the aid of welding flanges, overlapping structures, weld beads or the like. As a consequence, the duct of the present invention comprises a helically wound thermoplastic synthetic-resin hollow profile whose turns have lateral surfaces which contact one another and are bonded together with butt welds so that the free surfaces or walls of the hollow profile define the inner and outer surfaces of the duct.

The term "duct" is used hereinafter to refer to pipe, conduit, tubes, containers, receptacles and vessels, generally of round and preferably of cylindrical cross-section having inner and outer surfaces adapted to be contacted by a fluid and formed by the helical coiling of a tubular or hollow-profile extruded strand, strip or bar.

According to the invention, therefore, a duct of thermoplastic synthetic resin is formed from a coil (helix) of synthetic-resin material, preferably a thermoplastic, so that the exterior of the hollow profile is defined between a pair of parallel lateral flanks or sides and a pair of parallel other sides or flanks ("free walls") which constitute the inner and outer surfaces of the resulting duct when the turns are brought into abutting relationship at the lateral flanks. The turns of the coil thus are in surface contact with one another substantially over all of the surface area of the lateral flanks or sides and a butt weld is formed between the mutually contacting lateral sides so that the other sides remain free from engagement with one another and, as already noted, become substantially continuous to define the inner and outer surfaces of the duct.

The invention resides in the fact that such ducts are formed from thermoplastic hollow bands or profiles which have a substantially rectangular outer section and a substantially round inner section whereby the free sides or flanks are elastically deformable and adapted to sustain creep within limits whereby a bending of the duct to conform to the requirements of subterranean sewer pipe (laid in a ditch) is possible. The free walls of the hollow profile are thus able to be elastically deformed or placed under a creep-inducing load without exceeding the strength of the butt weld so that, with the passage of time, a relaxation process eliminates the deformation stress within the pipe.

The term "substantially rectangular" as used to describe the outer cross-section of the hollow-profile band is intended to include square cross-sections and cross-sections which deviate only slightly from the rectangular, e.g. parallelogrammatic or rhomboidal cross-sections.

The term "substantially round" is intended to include the preferred circular configuration as well as noncircular cross-sections of an arcuate nature (e.g., ovals or ellipses) as well as polygons which approach a circular, oval or ellipse shape. Such configurations may be produced directly upon extrusion or may be the result of deformation of the hollow profile during the duct-forming operation or prior thereto. The noncircular shape may be thus the result of the application of heat and pressure during the formation of the butt weld.

It has already been noted that prior-art techniques in the use of thermoplastics for the formation of helical-seam pipes have provided lap welds and an overlapping relationship of the successive turns of the coil which give rise to internal ridges, bulges corrugations and like formations which interfere with the flow of fluid. The lap-weld systems are not sufficiently flexible to be used for subterranean pipes and it has consequently been necessary to use extruded pipes of limited diameter and high cost or ceramic or concrete pipe when large diameters are employed. Ceramic and concrete pipes are provided in short lengths and must be sealed together by yieldable joints at high cost. All of these disadvantages and those enumerated earlier are obviated by the butt welding of the substantially rectangular-section hollow-profile turns together along substantially the full thickness of the hollow-profile band.

In flexible tubing, it is not uncommon to provide a load-absorbing coil spring about a more or less deflectible length of tube. The spring absorbs output force and supports the tube upon deflection. The hollow-profile system of the present invention inherently includes such a "spring" in the form of a free hollow-profile wall parallel to the other such wall. The flexibility parameters of the duct can be adjusted by varying the thickness of these free hollow-profile walls.

The hollow-profile bands may be composed of any thermoplastic material hitherto used in the pipe-construction art and especially polyvinyl chloride and polyethylene. The dimensioning of the synthetic-resin hollow profile may be carried out in terms of the polar moment of inertia to enable the duct to withstand pressure stresses inwardly or outwardly. Of course, where the duct is to be used primarily as a sewage or waste line, the significant pressure is the external pressure provided by the ground thereabove.

It has been found to be particularly advantageous to make the minimum thickness of the lateral (butt-welded) walls about 50% less than the minimum thickness of the free hollow-profile walls, the measurement being taken at the thinnest portion of each wall, i.e., along diameters of the circle circumscribed by the generally rectangular cross-section.

The absolute thickness of all walls of the hollow profile of course will be determined by the diameter of the resulting pipe and the stresses which are applied thereto.

Since the turns of the hollow-profile strip are bonded together over the entire area of the juxtaposed lateral surfaces of the adjoining turns, the inner surface of the duct is continuous and free from grooves which may interfere with the flow of fluid.

It is an important feature of the invention that, in the region of each butt weld, the thermoplastic material of the two turns form inwardly and outwardly enlarging V-section portions which have been found to be particularly satisfactory for effective bonding and for withstanding of tensile and bending stresses. Furthermore, the large portions of the V-section at the butt welds between successive turns can store sufficient heat to allow the extrusion heat to effect the welding under pressure without application of additional heat at the site at which the hollow-profile stream is brought into contact with the previously formed turn. The V-shaped accumulations of material also facilitate the relaxation process.

While the duct of the present invention can be formed from thermoplastic hollow-profile strips of a variety of configurations, it is important to note that the thickness of the strip (in the radial sense with respect to the duct) should be at least equal to the width of the strip (as measured parallel to the duct axis). The rectangular outer section may have rounded corners and the outer free wall may be crowned for added strength if desired. Furthermore, the strip may have a circular cross-section cavity which is deformed into an elliptical-section cavity during the coiling of the duct and the strip may be provided with a coating so that the outer and/or inner walls of the duct are formed from a material other than that which constitutes the body of the strip. A polygonal cross-section with rounded corners may also be used.

DESCRIPTION OF THE DRAWING

The above and other objects, features and advantages of the present invention will become more readily apparent from the following description, reference being made to the accompanying drawing in which.

SPECIFIC DESCRIPTION

Figure 1:
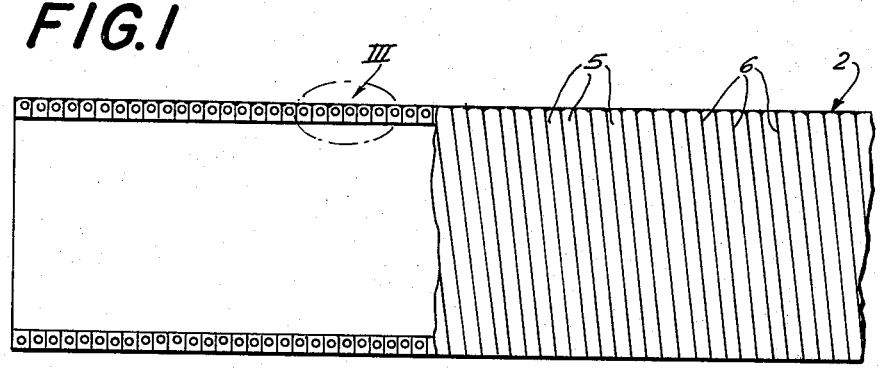
FIG. 1 is an elevational view, in diagrammatic form and with parts broken away, of a linear duct according to the present invention.

In FIG. 1 I show a duct having an inner wall 1a (FIG. 3) and an outer wall 1b, the walls being substantially continuous and the duct being of large diameter for the subterranean transmission of wastes. The duct comprises a multiplicity of laterally contacting turns 5

Figure 2:
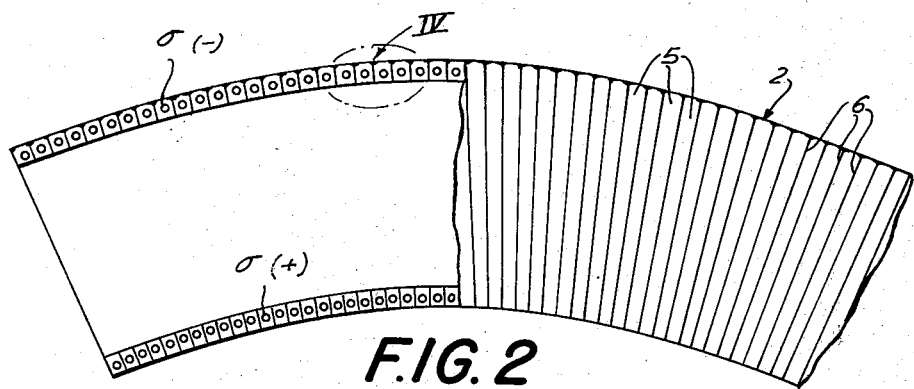
FIG. 2 is a view similar to FIG. 1 showing the duct after bending.

(FIGS. 1 and 2) of a single thermoplastic synthetic-resin hollow profile 2 (FIGS. 1–4) which is helically coiled to form the turns.

Figure 3:
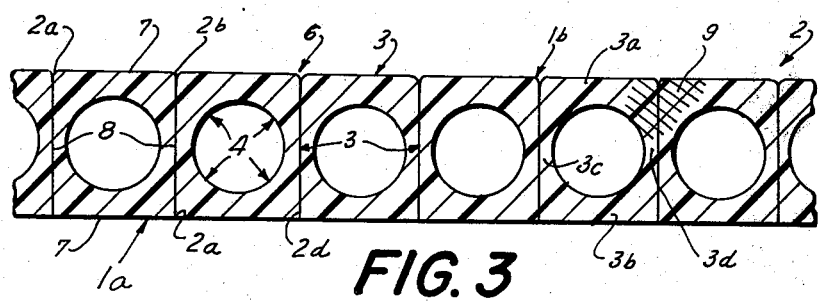
FIG. 3 is a detail view of the region III of FIG. 1.

As will be apparent from FIG. 3, the hollow-profile strip 2 has a generally square rectangular cross-section with sides represented at 3. These sides are defined by so-called free walls 3a and 3b and parallel lateral walls 3c and 3d. The cavity 4 through the strip 2 has a circular profile. In the regions of the lateral surfaces 8 of walls 3c and 3d, the turns are heat-sealed together over the entire areas of the lateral faces to form helical seams 6, heretofore referred to as butt welds since the bonding takes place with continuous area contact without the deposit of weld material.

Figure 6:
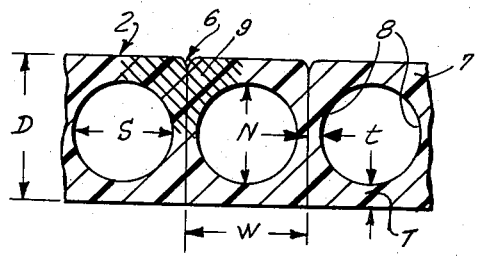
FIG. 6 is a cross-section through a duct according to the invention, generally similar to the section of FIG. 3 but illustrating some additional characteristics of the system.
Figure 9:
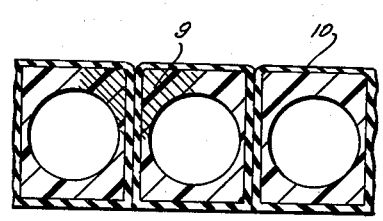
FIG. 9 is a view similar to FIG. 6 in which the strip is formed of two different types of material.

As shown in FIG. 6, the thickness $t$ at the narrowest portion of the lateral wall is about equal to 0.5 T, the thickness of the narrowest portion of each free wall.

In FIG. 3, the hollow profile 2 has rounded corners 2a and 2b at the portions destined to form the outer wall 1b of the duct but right-angle corners 2c and 2d at the portions destined to form the inner wall 1a so that the inner wall of the duct is fully continuous and free from grooves or projections which might interfere with fluid flow.

Figure 4:
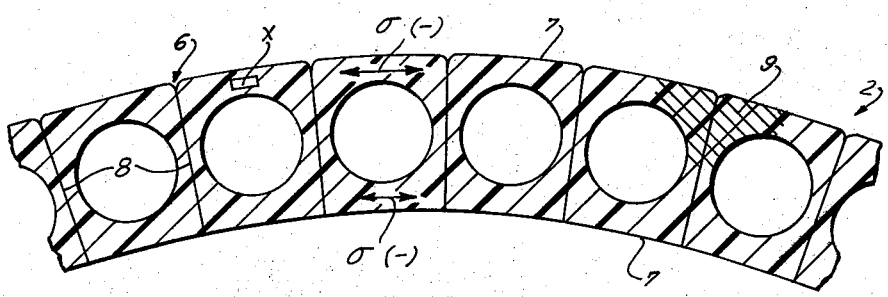
FIG. 4 is a detail view of the region IV of FIG. 2.
Figure 5:
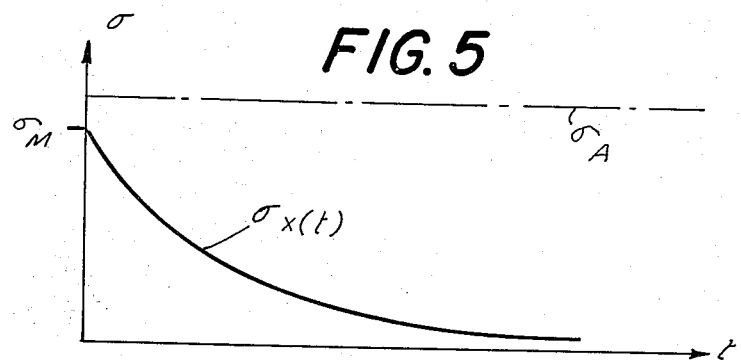
FIG. 5 is a graph showing the relaxation process as a function of time.

As noted, the duct is intended to be laid into a trench or ditch in the ground and to serve as a large-diameter waste pipe, e.g., a waste pipe having a diameter ranging from, say, 0.5 meters to 3 meters, and must be sufficiently flexible to accommodate changes in direction. This will be apparent from FIG. 2 wherein the pipe or duct of FIG. 1 is shown to be bent. Along the outer limb of the bend, therefore, the deformation stress $\sigma$ is negative, the stress being tensioned, whereas the walls 7 along the inner limb of the bend are under compression, i.e., a positive value of $\sigma$ or, as represented in the drawing, $\sigma(+)$. These stresses apply to the walls 7 which elastically deform as best seen in FIG. 4 as long as the stress does not exceed the bonding force at the butt welds 6 or the tensile strength of the walls 7.

Since the pipe is composed of a synthetic-resin material, the deformation stress $\sigma$ falls from its initial value of $\sigma_M$ asymptotically to 0 as a function of time $t$, the maximum allowable stress being represented by $\sigma_A$. The curve represents the function $\sigma_X(t)$, where $X = $ a unit volume and is generally a hyperbola.

The curve or characteristic may be varied by adjusting the thickness of the free walls 7 and the material constituting the helically wound strip. The compressive stress likewise falls as a function of time during the relaxation process.

Preferably the duct is constituted from polyvinyl chloride or another thermoplastic synthetic resin commonly used in the production of pipe, the thickness $D$ of the strip in the radial direction is at least equal to the width $W$ thereof in the axial direction and the width $S$ of the cavity 4 in the axial direction is at most equal to the width $N$ in the radial direction. Of course, in the preferred case in which the cavity is of circular cross-section, $S = N$ and in the preferred case in which the wall thickness $t$ and $T$ are in the ratio of 1:2, $N + 4t = D$ and $S + 2t = W$, where $D \geq W$.

In all of the embodiments illustrated, a V-section accumulation of material is provided by each pair of turns at their respective heat seal or weld 6 as represented at 9 in cross-hatching. These accumulations of material store heat during extrusion of the strip 2 to enable the extrusion heat to provide all of the thermobonding energy when the turns are axially pressed together. These accumulations also serve to supply material enabling creep during relaxation of the deformation stresses.

Figure 7:
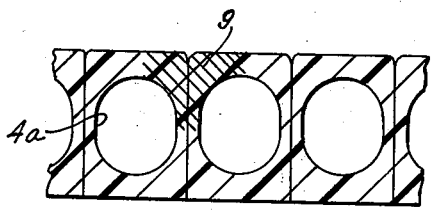
FIG. 7 is a view similar to FIG. 6 wherein the inner cavity of the hollow-profile strip has an oval cross-section.
Figure 10:
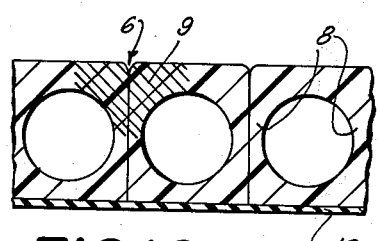
FIG. 10 is another detail sectional view of a system in which the duct has a lining of a material different from that forming the body of the strip.
Figure 8:
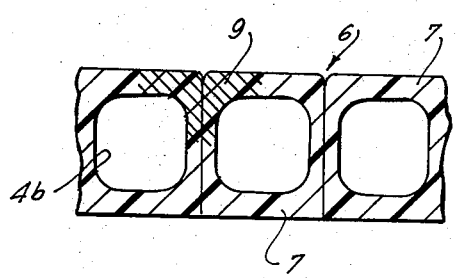
FIG. 8 is a view similar to FIG. 6 showing a system in which the round-section cavity has still another configuration.
Figure 11:
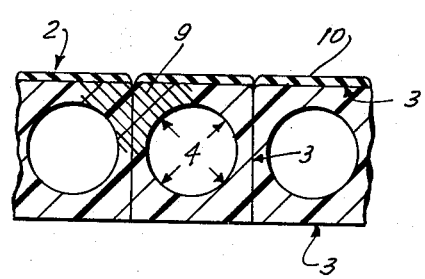
FIG. 11 is a view similar to FIG. 6 illustrating a feature of the invention wherein the duct has an outer lining.

In FIGS. 7 and 8, the inner cavity 4a and 4b is shown to be generally oval or to have a polygonal configuration with rounded corners.

The strip 2 may be coated with, for example, another synthetic-resin rubber or pigment layers at 10 or 11 to form inner and/or outer walls of the duct to prevent chemical attack on the thermoplastic material and, it desired, to form an opaque or black coating on the exterior of the duct to prevent ultraviolet irradiation of the synthetic-resin material and ultimate deterioration thereof.

It is claimed:

1. A large-diameter duct consisting of a multiplicity of generally helical turns of a hollow-profile strip, the strip being of substantially square outer cross-section and substantially circular internal cross-section, said strip having a pair of lateral parallel flank walls and a pair of free walls between said flanks, the flank walls of adjoining turns being butt-welded together whereby said free walls define inner and outer surfaces of the duct, said strip being composed of polyvinylchloride or polyethylene thermoplastic synthetic-resin material enabling elastic deformation of said free walls upon bending of said duct and relaxation of the deformation stresses in said free walls with time, said strip having a minimum wall thickness at said lateral flanks which is approximately 50% of the minimum wall thickness at said free walls, each pair of adjoining turns defining accumulations of thermoplastic material of V-section at the butt-weld between them.

2. The duct defined in claim 1 wherein said strip is coated alone one of said walls with a different material.

3. The duct defined in claim 1 wherein the free walls of said turns defining the inner surface of said duct are flush with one another whereby said inner surface is continuous.

* * * * *